(12) United States Patent
Horski et al.

(10) Patent No.: US 7,156,615 B2
(45) Date of Patent: Jan. 2, 2007

(54) FAN SHROUD STRUCTURE FOR REDUCING RESONANCE, IMPROVING STIFFNESS AND MANUFACTURABILITY

(75) Inventors: Marek Horski, London (CA); Bonifacio Castillo, London (CA); Liviu Stancu, London (CA); Paul McLennan, London (CA)

(73) Assignee: Siemens VDO Automotive Inc., Chatham (CA)

( * ) Notice: Subject to any disclaimer, the term of this patent is extended or adjusted under 35 U.S.C. 154(b) by 163 days.

(21) Appl. No.: 10/919,942

(22) Filed: Aug. 17, 2004

(65) Prior Publication Data
US 2005/0042088 A1   Feb. 24, 2005

Related U.S. Application Data

(60) Provisional application No. 60/496,979, filed on Aug. 21, 2003.

(51) Int. Cl.
*F01D 258/04*   (2006.01)
*F04D 29/66*   (2006.01)

(52) U.S. Cl. ...................... 415/119; 416/189

(58) Field of Classification Search ............... 415/119, 415/211.2, 213.1, 228; 416/169 A, 189; 123/41.49; 417/423.15
See application file for complete search history.

(56) References Cited

U.S. PATENT DOCUMENTS

| | | | | |
|---|---|---|---|---|
| 5,489,186 A | * | 2/1996 | Yapp et al. | 415/58.7 |
| 6,106,228 A | * | 8/2000 | Bartlett | 415/146 |
| 6,123,051 A | * | 9/2000 | Kubina et al. | 123/41.49 |
| 6,223,548 B1 | * | 5/2001 | Calvert | 62/304 |
| 6,309,176 B1 | * | 10/2001 | Periyathamby et al. | 415/119 |
| 6,474,943 B1 | * | 11/2002 | Kataoka et al. | 415/173.1 |
| 6,554,230 B1 | * | 4/2003 | Horski | 248/49 |

* cited by examiner

*Primary Examiner*—Edward K. Look
*Assistant Examiner*—Nathan Wiehe

(57) ABSTRACT

A fan shroud structure 10 is constructed and arranged to carry a fan. The fan shroud structure includes a body 12 having a periphery, a main surface, and an annular rim 26 defining a generally central opening 28. The opening 28 is sized to accommodate blades of a fan. Fan mounting structure 30 is coupled with the body and is disposed generally adjacent to the central opening. The fan mounting structure is constructed and arranged to support a motor of a fan. The body includes a plurality of surfaces features 34 constructed and arranged to affect resonance of the shroud structure with each feature having a surface 36 that is discontinuous with respect to the main surface 38 of the body. Each feature 34 also extends from the annular rim to the periphery of the body.

15 Claims, 4 Drawing Sheets

FAN SHROUD STRUCTURE FOR REDUCING RESONANCE, IMPROVING STIFFNESS AND MANUFACTURABILITY

This application is based on U.S. Provisional Application No. 60/496,979, filed on Aug. 21, 2003, and claims the benefit thereof for priority purposes.

FIELD OF THE INVENTION

The invention relates to fan shroud structures and more particularly to a fan shroud structure that that reduces resonance, improves stiffness and manufacturability of the shroud.

BACKGROUND OF THE INVENTION

Currently, fan shrouds that are in a box shape are excitable (by resonance) in the operating range of the fan motor or other periodic signals in the machine the fan is placed in, such as a vehicle. In addition, due to the box-like structure of typical shrouds, there is a need for substantial structural re-enforcement to minimize warping and distortion. However, the use of such significant re-enforcement can increase the manufacturability (e.g. moldability) of the shroud and cost of materials, while adversely affecting airflow properties.

Thus, there is a need to provide an improved fan shroud structure that reduces resonance, and improves stiffness and manufacturability.

SUMMMARY OF THE INVENTION

An object of the present invention is to fulfill the need referred to above. In accordance with the principles of the present invention, this objective is obtained by a providing a fan shroud structure constructed and arranged to carry a fan. The fan shroud structure includes a body having a periphery, a main surface, and an annular rim defining a generally central opening. The opening is sized to accommodate blades of a fan. Fan mounting structure is coupled with the body and is disposed generally adjacent to the central opening. The fan mounting structure is constructed and arranged to support a motor of a fan. The body includes a plurality of surfaces features constructed and arranged to affect resonance of the shroud structure with each feature having a surface that is discontinuous with the main surface of the body. Each surface feature also extends from the annular rim to the periphery of the body.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
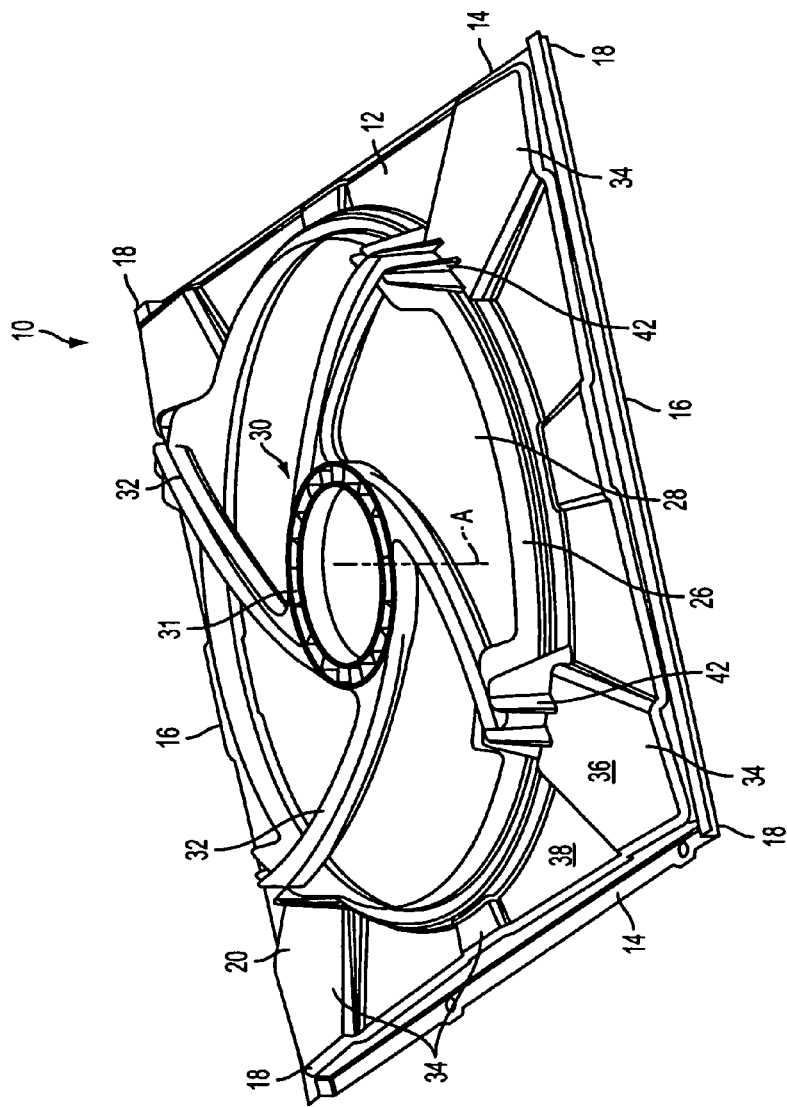
FIG. 1 is an isometric view of a front of a shroud structure provided in accordance with the principles of the invention.
Figure 2:
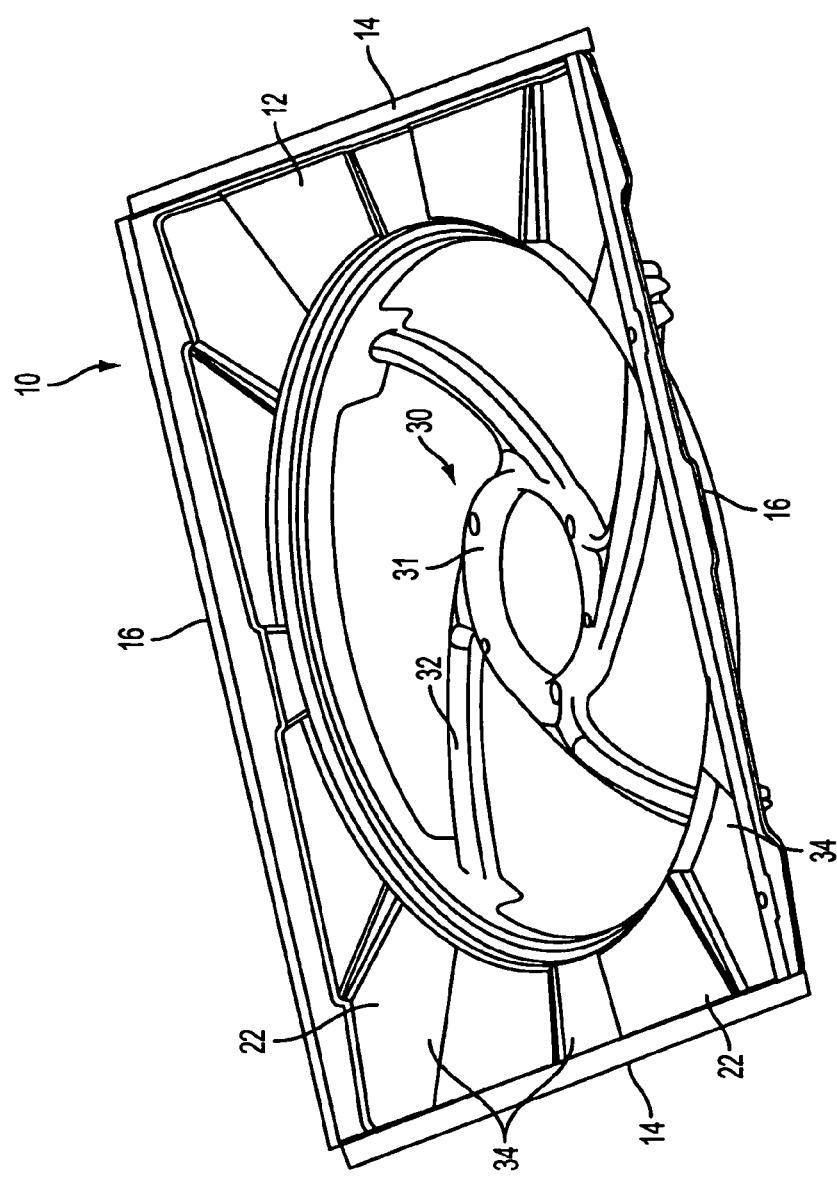
FIG. 2 is an isometric view of a back of the shroud structure of FIG. 1.

With reference to FIGS. 1 and 2, a fan shroud structure, generally indicated at 10, is shown in accordance with the principles of a first embodiment of the present invention. FIG. 1 shows an isometric front view of shroud structure 10 and FIG. 2 shows an isometric rear view of shroud structure 10. The shroud structure 10 is preferably molded from plastic or composite material.

The shroud structure 10 is preferably part of a fan module that is configured to be mounted between a condenser and a radiator. The shroud structure 10 includes a shroud body 12 having a pair of opposing first sides 14 and a pair opposing second sides 16. The first sides 14 are joined with the second sides 16 at corners 18 so as to form a box-like configuration having a periphery. The shroud body 12 has a front end 20 (FIG. 1) and a back end 22 (FIG. 2). The body 12 includes an annular rim 26 defining a central opening 28 sized to accommodate fan blades (not shown). The shroud structure 10 also includes motor mounting structure, generally indicated at 30, disposed generally adjacent to the central opening 28. The motor mounting structure preferably 30 includes a motor mounting base 31 supported in the central opening 28 via support arms 32 coupled to the rim 26. A fan motor (not shown) can be mounted to the base 31 of the motor mounting structure 30.

With reference to FIGS. 1 and 2, the body 12 of the shroud structure 10 includes a plurality of surface features 34, extending from the annular rim 26 to associated sides 14, 16 (e.g., to the periphery of body 12). As shown, each surface features 34 defines a step such that a surface 36 of each feature 34 is discontinuous with a generally planar, main surface 38 of the body 12. As used herein, the term discontinuous means that, although surfaces 36 and 38 are joined directly or indirectly, they are not on the same plane.

Figure 3:
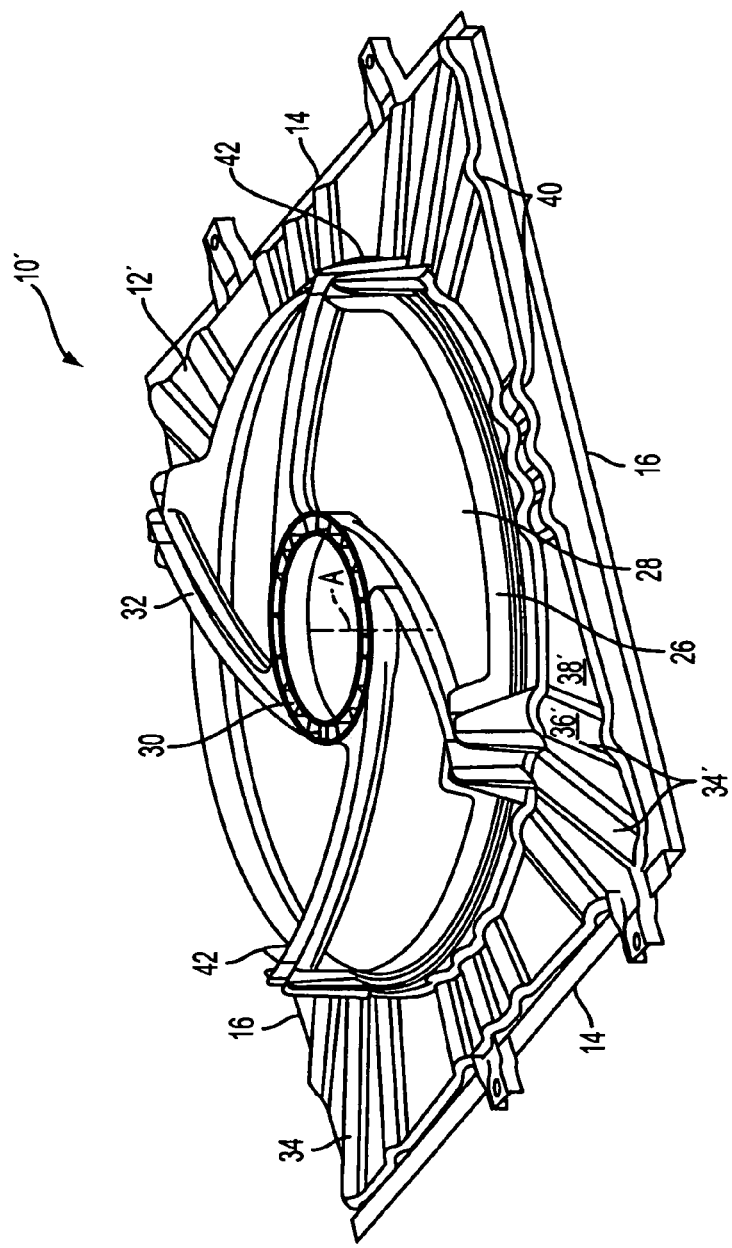
FIG. 3 is an isometric view of a front of a shroud structure provided in accordance with another embodiment of the invention.
Figure 4:
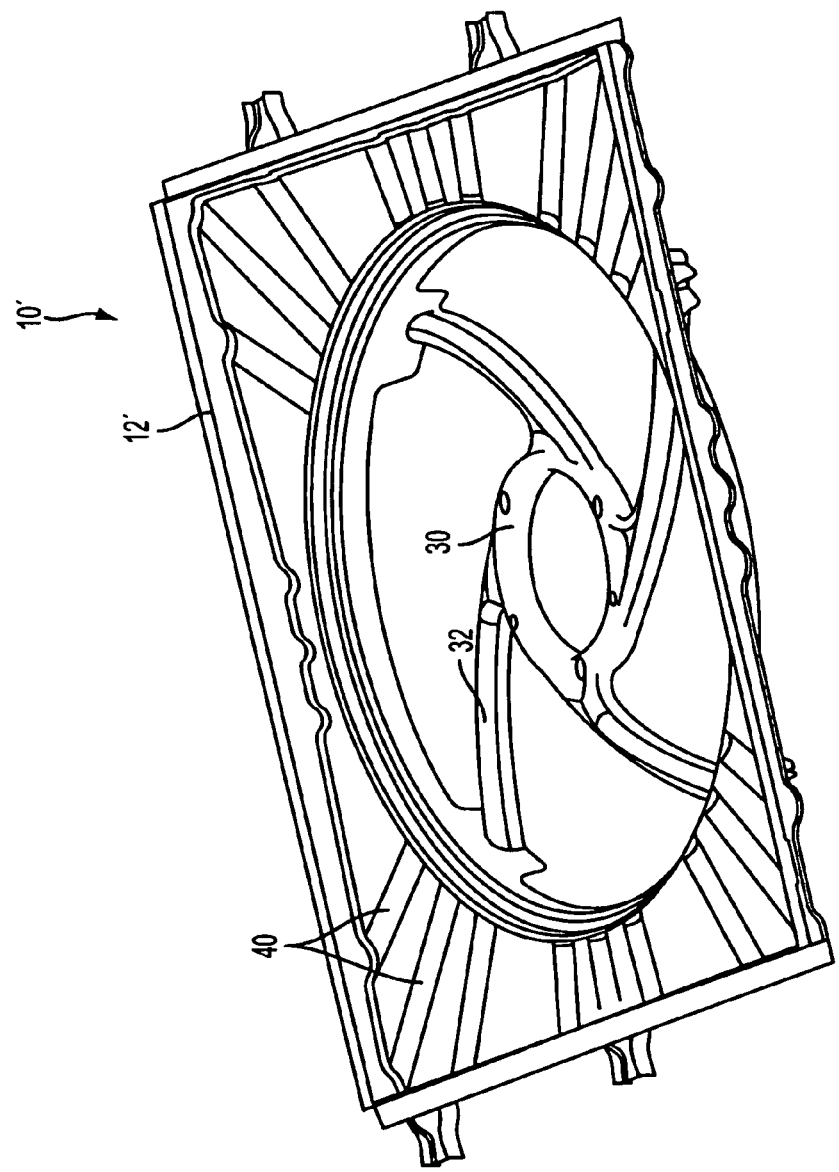
FIG. 4 is a perspective view of a back of the shroud structure of FIG. 3.

Although eight surface features 34 are shown and each feature 34 is shown to be of stepped configuration, the number and configuration of the surface features can vary. For example, FIGS. 3 and 4 shows a plurality of surface features 34' defining troughs 40 in the body 12 of shroud structure 10', with curved surface 36' being discontinuous (not on the same plane) with the generally planar, main surface 38'. Thus, the curved surface 36' of each trough 40 disrupts the generally planar main surface 38'. The troughs 40 are best shown in FIG. 4. In the embodiments, the features 34 and 34' preferably extend radially with respect to a central axis A defined with respect to the rim 26 of the shroud structure 10, 10'.

The use of the features 34, 34' to define discontinuous surfaces in the body 12 not only shifts, reduces, or eliminates resonance in the shroud structure 10 or 10', but the surface features along with ribs 42 also improve the structural properties of the shroud structure. Thus, a rib 42 is coupled, at the rim 26, between a surface feature 34 and an associated arm 30. Thus, the shroud structure, with features 34, 34' and associated ribs 42, provides a higher level of stiffness as compared to plain ribbing reinforcement of similar plastic or composite structures.

Conventionally, to ensure sufficient stiffness, reinforcement ribs extend (or a second set added) radially outward toward the perimeter of the shroud structure. However, such additional rib reinforcement requires additional material (at additional cost), requires a more complex molding process, and could adversely affect airflow parameters. Since the features 34, 34' extend to the perimeter (e.g., sides 14, 16) of the body 12, they provide geometrical stability so that warping and distortion is reduced or eliminated. Thus, due to the features 36, 36', the above mentioned rib reinforcement is not necessary and a higher frequency shroud structure is provided (e.g., to 40 hertz or higher) of low mass, thermoplastic or composite material. In addition, manufacturability is simplified since molds do not need to include the conventional, complicated rib reinforcement structure.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A fan shroud structure constructed and arranged to carry a fan, the fan shroud structure comprising:
    a body having a periphery, a main portion, and an annular rim defining a generally central opening, the opening being sized to accommodate blades of a fan,
    fan mounting structure coupled with the body and disposed generally adjacent to the central opening, the fan mounting structure being constructed and arranged to support a motor of a fan,
    wherein the body includes a plurality of surface features constructed and arranged to affect resonance of the shroud structure, each feature extending from the annular rim to the periphery of the body, with the surface features completely surrounding the annular rim, and
    wherein each feature has a first surface that extends above the main portion at a front end of the body and an opposing second surface that extends below the main portion at a back end of the body, whereby each first and second surface is discontinuous with respect to the main portion of the body.

2. The shroud structure of claim 1, wherein each surface feature defines a step between the surface and the main portion.

3. The shroud structure of claim 1, wherein each surface feature defines a trough with said surface being a curved surface and wherein the main portion is generally planar.

4. The shroud structure of claim 1, wherein a central axis is defined with respect to the rim and each surface feature extends radially with respect to the central axis.

5. The shroud structure of claim 1, wherein the fan mounting structure includes a mounting base and a plurality of arms connecting the mounting base to the rim of the body.

6. The shroud structure of claim 5, further including a support rib coupled, at the rim, between a surface feature and an associated arm.

7. The shroud structure of claim 1, wherein the body has an opposing pair of first sides and an opposing pair of second sides to define a box-like configuration.

8. A fan shroud structure constructed and arranged to carry a fan, the fan shroud structure comprising:
    a body having a main portion defining a periphery, and an annular rim defining a generally central opening, the opening being sized to accommodate blades of a fan,
    fan mounting structure coupled with the body and disposed generally adjacent to the central opening, the fan mounting structure being constructed and arranged to support a motor of a fan,
    wherein the body includes means for affecting resonance of the shroud structure extending from the annular rim to the periphery of the body, with the means for affecting resonance completely surrounding the annular rim, and
    wherein the means for affecting resonance includes a first surface extending above the main portion at a front end of the body and an opposing second surface extending below the main portion at a back end of the body such that each first and second surface is discontinuous with respect to the main portion of the body.

9. The shroud structure of claim 8, wherein the means for affecting resonance includes a plurality of surface features defining steps in the body such that a surface of each step is on a plane different from a plane on which the main portion resides.

10. The shroud structure of claim 8, wherein the main portion is generally planar and the means for affecting resonance includes a plurality of surface features defining troughs in the body, with each trough defining a generally curved surface disrupting the generally planar main portion.

11. The shroud structure of claim 9, wherein a central axis is defined with respect to the rim and each surfaces feature extends radially with respect to the central axis.

12. The shroud structure of claim 10, wherein a central axis is defined with respect to the rim and each surfaces feature extends radially with respect to the central axis.

13. The shroud structure of claim 8, wherein the fan mounting structure includes a mounting base and a plurality of arms connecting the mounting base to the rim of the body.

14. The shroud structure of claim 13, further including a support rib coupled, at the rim, between a surface feature and an associated arm.

15. The shroud structure of claim 8, wherein the body has an opposing pair of first sides and an opposing pair of second sides to define a box-like configuration.

* * * * *